United States Patent
Suh et al.

(10) Patent No.: US 7,214,556 B2
(45) Date of Patent: May 8, 2007

(54) METHOD FOR FORMING ALIGNMENT LAYER OF LCD

(75) Inventors: Dong Hae Suh, Seoul (KR); Young Il Park, Seoul (KR); Soo Young Choi, Kyoungki-do (KR); Gon Son, Kyoungki-do (KR)

(73) Assignee: Boe Hydis Technology Co., Ltd., Kyoungi-Do (KR)

( * ) Notice: Subject to any disclaimer, the term of this patent is extended or adjusted under 35 U.S.C. 154(b) by 0 days.

(21) Appl. No.: 11/195,903

(22) Filed: Aug. 3, 2005

(65) Prior Publication Data

US 2006/0258032 A1    Nov. 16, 2006

(30) Foreign Application Priority Data

May 11, 2005    (KR) ...................... 10-2005-0039250

(51) Int. Cl.
*H01L 21/00*    (2006.01)

(52) U.S. Cl. ............................ 438/30; 438/21; 438/32; 438/149

(58) Field of Classification Search ................... 438/30, 438/31, 32, 149; 349/187–190
See application file for complete search history.

(56) References Cited

U.S. PATENT DOCUMENTS

2005/0260426 A1* 11/2005 Kwok et al. ............. 428/473.5
2006/0035038 A1*  2/2006 Lee et al. ..................... 428/1.2

FOREIGN PATENT DOCUMENTS

JP    10-1999-0075414        10/1999
KR    10-2004-0110833 A    12/2004

* cited by examiner

*Primary Examiner*—Hsien-Ming Lee
(74) *Attorney, Agent, or Firm*—Timothy J. Keefer; Seyfarth Shaw LLP

(57) ABSTRACT

Disclosed is a method for forming an alignment layer of an LCD capable of preventing Mura defects when the alignment layer is formed through an LC one drop fill process. The method includes the steps of coating a mixing solution including a solvent and organic polymer materials consisting of polyimide and polyamic acid on the substrates, pre-curing the mixing solution twice with mutually different temperatures, thereby volatizing the solvent and obtaining stable phase-separation between the organic polymer materials and the solvent, and completely curing the pre-cured mixing solution at a temperature of about 180 to 240° C. A primary pre-curing process is performed at a temperature less than 50° C. under vacuum pressure of about −35 to −50 psi, and a secondary pre-curing process is performed at a temperature within a range of about 50 to 75° C. under the same vacuum pressure.

5 Claims, 1 Drawing Sheet

METHOD FOR FORMING ALIGNMENT LAYER OF LCD

BACKGROUND OF THE INVENTION

1. Field of the Invention

The present invention relates to a method for forming an alignment layer of a liquid crystal display (LCD). More particularly, the present invention relates to a method for forming an alignment layer of an LCD capable of preventing Mura defects when the alignment layer is formed through an LC one drop fill (ODF) process.

2. Description of the Prior Art

As generally known in the art, an LCD can be fabricated in a compact size with light weight and low power consumption functions, so the LCD has been employed in various information appliances or video appliances, instead of a cathode ray tube (CRT). In particular, a thin film transistor (TFT) LCD can provide a large-sized display screen with a superior image quality corresponding to that of the CRT, so the TFT LCD has been spotlighted in notebook PC and monitor markets. In addition, it is expected that the LCD may make inroads into TV markets.

Such an LCD mainly includes a lower substrate (TFT array substrate) having a pixel electrode, an upper substrate (color filter substrate) having a common electrode and a liquid crystal layer aligned between the lower substrate and the upper substrate. In addition, an alignment layer, which is an organic polymer layer, is formed at an inner uppermost portion of each substrate in order to align liquid crystal in a predetermined direction and a polarizing plate is attached to an outer surface of each substrate. The organic polymer layer is subject to a rubbing process after the organic polymer layer has been coated on the substrate in order to allow the organic polymer layer to have an anisotropic characteristic.

In most cases, the liquid crystal layer is formed through a liquid injection process using osmotic pressure. However, as the size of the LCD becomes enlarged, it may frequently happen that the liquid crystal is not completely injected into the LCD through the liquid injection process, causing the defect of the LCD. In particular, since relatively long time is necessary to inject the liquid crystal between substrates, productivity of the LCD may be lowered if the liquid crystal layer is formed through the liquid injection process.

To solve the above problem, an LC one drop fill (ODF) process capable of simplifying manufacturing processes while improving productivity of the LCD has been currently suggested. According to the above LC ODF process, a predetermined amount of liquid crystal drops onto the lower substrate, and then the lower substrate is combined with an upper substrate under a vacuum atmosphere, thereby forming a liquid crystal layer.

Hereinafter, a method for fabricating an LCD by using a conventional ODF process will be briefly described.

First, a lower substrate and an upper substrate, which have undergone an array process and a color filter process, respectively, are prepared. Then, an alignment material is coated on the lower and upper substrates, respectively. After that, the alignment materials are subject to a rubbing process in such a manner that the liquid crystal acquires isotropic characteristics.

Then, after cleaning the lower and upper substrates, a sealing agent is coated on an edge part of the upper substrate. At this time, the sealing agent can also be coated on the lower substrate. After that, the lower substrate is introduced into a liquid crystal dispenser, and then a predetermined amount of liquid crystal drops onto on a predetermined portion of the lower substrate, which corresponds to a display region of the LCD.

After that, the lower and upper substrates are introduced into a vacuum chamber where the lower substrate is combined with the upper substrate due to vacuum pressure applied thereto and a gap formed between the lower and upper substrates is filled with the liquid crystal. Then, if the sealing agent applied to the edge of the upper substrate has been cured, the LC ODF process is completed.

However, as the size of the LCD becomes enlarged, there is necessity to provide an alignment layer having superior characteristics for minimizing defects derived from the ODF process. In addition, since it is difficult to form the alignment layer corresponding to the large-sized substrate, Mura defects may occur when forming the alignment layer through the LC ODF process, degrading reliability of articles.

In detail, according to a conventional method for forming the alignment layer, a mixing solution of organic polymer materials consisting of polyimide (PI) and polyamic acid (PAA) is coated on the substrate, and then the mixing solution is pre-cured at the temperature of about 80° C. in order to volatilize a solvent contained in the solution and to align the organic polymer materials. Subsequently, the mixing solution is completely cured at the temperature of about 180 to 230 80° C., thereby forming the alignment layer. Then, the alignment layer is mechanically rubbed by means of a rubbing roller.

The conventional method may not degrade the performance of the alignment layer if it is applied to a conventional liquid crystal cell process using a hot press process or a liquid crystal injection process. However, if the conventional process is applied to a conventional liquid crystal cell process using the ODF process, vertical and horizontal tensions are applied to the alignment layer while the ODF process is being carried out, so that an alignment order between surfaces of the liquid crystal and the alignment layer may be degraded. As a result, the Mura defect may occur in the alignment layer, lowering the image quality of the LCD.

SUMMARY OF THE INVENTION

Accordingly, the present invention has been made to solve the above-mentioned problems occurring in the prior art, and an object of the present invention is to provide a method for forming an alignment layer of an LCD capable of preventing performance of the alignment layer from being degraded even if the alignment layer is formed in a large-sized LCD through an LC one drop fill (ODF) process.

In order to accomplish the above object, according to the present invention, there is provided a method for forming an alignment layer on inner uppermost portions of an upper substrate having a pixel electrode and a lower substrate having a common electrode such that the alignment layer has a highly ordered alignment surface for aligning liquid crystal in a predetermined direction, the method comprising the steps of: coating a mixing solution including a solvent and organic polymer materials consisting of polyimide and polyamic acid on the substrates; pre-curing the mixing solution twice with mutually different temperatures, thereby volatizing the solvent and obtaining stable phase-separation between the organic polymer materials and the solvent while forming the highly ordered alignment surface on the alignment layer; and completely curing the pre-cured mixing solution at a temperature of about 180 to 240° C.

According to the preferred embodiment of the present invention, the pre-curing process includes a primary pre-curing process, which is performed at a temperature less than 50° C. under vacuum pressure of about −35 to −50 psi, and a secondary pre-curing process, which is performed at a temperature within a range of about 50 to 75° C. under vacuum pressure identical to the vacuum pressure of the primary pre-curing process.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, the present invention will be described with reference to accompanying drawings.

An LCD includes a lower substrate having a pixel electrode for driving liquid crystal, an upper substrate having a common electrode and a liquid crystal layer aligned between the lower substrate and the upper substrate. In addition, an alignment layer is formed at an inner uppermost portion of each substrate in order to align liquid crystal in a predetermined direction. The alignment layer is subject to a rubbing process after the alignment layer has been coated on the substrate in order to allow the alignment layer to have an anisotropic characteristic.

In order to form the alignment layer, a mixing solution of polyimide (PI) and polyamic acid (PAA) is coated on the substrate, and then the mixing solution is pre-cured under the high temperature atmosphere, thereby volatilizing a solvent contained in the solution and obtaining phase-separation between organic polymer and the solvent. After that, the pre-cured mixing solution is completely cured under the higher temperature atmosphere, thereby forming the alignment layer. However, as the size of the LCD becomes enlarged, performance of the alignment layer formed through the above procedure may be degraded due to vertical and horizontal tensions applied thereto while an LC one drop fill (ODF) process is being carried out, thereby lowering the image quality of the LCD.

To solve the above problem, according to the present invention, the pre-cure process is performed twice at the predetermined temperature lower than the conventional pre-cure temperature, thereby obtaining stable phase-separation between an organic polymer material and a solvent while forming a highly ordered alignment surface on the alignment layer. Thus, the performance of the alignment layer cannot be degraded even if a liquid crystal layer is formed through the ODF process in the following liquid crystal cell process.

Figure 1:
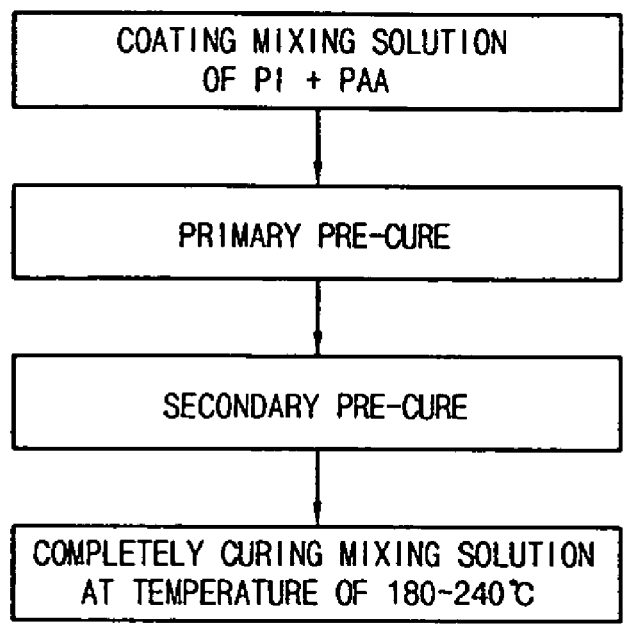
FIG. 1 is a block view illustrating a method for forming an alignment layer having a highly ordered alignment surface according to one embodiment of the present invention.
Figure 2:
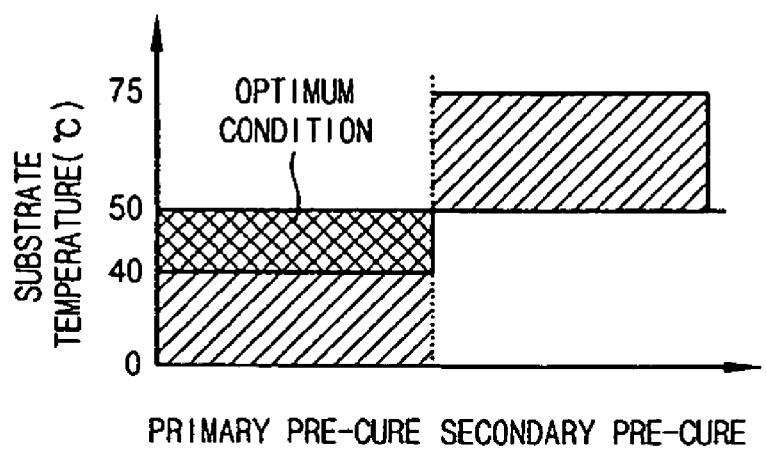
FIG. 2 is a graph illustrating a substrate temperature during a pre-cure process, which is a part of a method for forming an alignment layer having a highly ordered alignment surface according to one embodiment of the present invention.

FIG. 1 is a block view illustrating a method for forming an alignment layer having a highly ordered alignment surface according to one embodiment of the present invention, and FIG. 2 is a graph illustrating a substrate temperature during a pre-cure process, which is a part of a method for forming an alignment layer having a highly ordered alignment surface according to one embodiment of the present invention. Hereinafter, the present invention will be described with reference to FIGS. 1 and 2.

First, large-sized substrates, which have undergone an array process and a color filter process, are prepared. Then, a mixing solution including a solvent and organic polymer materials consisting of polyimide (PI) and polyamic acid (PAA) mixed with each other in a predetermined ratio is coated on the substrates. At this time, the mixing solution may consist of the solvent and PI or consist of the solvent and PAA.

After that, the substrates coated with the mixing solution (that is, alignment materials) are introduced into an apparatus having a heat plate provided with a vacuum hole and a support pin. Then, the support pin is moved up in order to lift the substrate from the heat plate by a distance of about 3 to 8 mm. In this state, the heat plate is heated under vacuum pressure of about −35 to −50 psi in such a manner that the substrate has a temperature less than 50° C., preferably, within a range of about 40 to 50° C. due to convention heat, thereby primarily pre-curing the alignment materials coated on the substrate. Then, the support pin is moved down such that the substrate is placed on the heat plate. After that, the heat plate is again heated under the same vacuum pressure in such a manner that the substrate has a temperature within a range of about 50 to 75° C., thereby secondarily pre-curing the alignment materials coated on the substrate. While performing the above primary and secondary pre-cure processes, the solvent contained in the mixing solution can be volatilized and stable phase-separation can be achieved between the organic polymer material and the solvent. In addition, a highly ordered alignment surface can be formed on the alignment layer.

After that, the alignment materials, which have undergone the primary and secondary pre-cure processes with mutually different temperature, are completely cured at the temperature of about 180 to 240° C., thereby forming the alignment layer.

Then, the surface of the alignment layer is mechanically rubbed by means of a rubbing roller.

The mixing solution including the solvent, PI, and PAA coated on the substrate in order to form the alignment layer having a highly ordered alignment surface adaptable for the ODF process must satisfy following Equation 1.

$$\Delta Gm = \Delta Hm - T \cdot \Delta Sm$$

$$\Delta Hm = V \cdot \Phi 1 \Phi 2 [S1 - S2]2 \qquad \text{Equation 1}$$

wherein, V is a total mixing volume, Φ is a polymer volume ratio, S is a polymer solubility constant, T is a temperature, Sm is variation of entropy, Hm is variation of enthalpy, and Gm is Gibbs free energy.

The mixing solution satisfying Equation 1 is coated on the substrate (for example, a glass substrate, an ITO substrate or a metal substrate), in such a manner that it can stably form an initial state of the alignment layer. The solvent and the temperature are main factors required for stably forming the alignment layer. For instance, if the mixing solution contains less than 25% of a BC (Buthlcellosolve) solvent, it is necessary to maintain the temperature of the substrate coated with the alignment material less than 75° C. in order to obtain a stable PI layer. In particular, if the alignment layer is made form an alignment material used for controlling the alignment of the liquid crystal, it is preferred for the mixing solution to contain less than 10% of the BC solvent. In this case, stable phase separation is achieved between organic polymer and the solvent, so that the alignment layer may have a highly ordered alignment surface.

Thus, according to the present invention, after the alignment material satisfying Equation 1 has been coated on the substrate, the primary and secondary pre-cure processes are carried out under the above temperature conditions, so that stable phase separation is realized between organic polymer materials and the solvent. In addition, the highly ordered alignment surface can be formed on the alignment layer, thereby improving surface uniformity of the alignment layer. Therefore, the performance of the alignment layer can be effectively prevented from being degraded even if the liquid crystal layer is formed through the LC ODF process in the following liquid crystal cell process.

In addition, the alignment characteristics of the liquid crystal may exert influence upon the optical characteristics of the LCD, so it is necessary to properly control the alignment characteristics of the liquid crystal. As mentioned above, the alignment layer exerts great influence upon the alignment characteristics of the liquid crystal. In addition, it is necessary to properly adjust rubbing strength (RB) for the alignment layer during the rubbing process.

That is, if the alignment layer has an abnormal surface, minute pores are formed on the surface of the alignment layer after the rubbing process has been carried out. In this state, if the liquid crystal drops onto the surface of the alignment layer through the ODF process, vertical tension may be applied to the alignment layer so that stability of the alignment layer is significantly lowered.

Accordingly, after stably forming the alignment layer, the rubbing process is carried out with a proper RS value in order to improve the characteristics of the alignment layer. It is advantageous to set proper RS and uniform rubbing intensity over the whole area of the alignment layer when the rubbing process is performed with respect to the surface of the alignment layer by means of a rubbing roller including rubbing fabric made from cotton or rayon wound around the rubbing roller.

According to the present invention, if the rubbing process is performed using cotton fabric in a TN mode, the RS value is preferably within a range of 35 to 45. In addition, if the rubbing process is performed using rayon fabric in the TN mode, the RS value is preferably within a range of 50 to 55. In a case when the rubbing process is performed in an FFS mode or an IPS mode, the RS value is within a range of 28 to 45. At this time, a winding gap of the rubbing fabric is less than 1 mm.

As a result, the present invention may improve uniformity of the alignment layer and stability of the rubbing process, so that it is possible to form a polyimide alignment layer having high density while effectively preventing polyimide alignment layer from being damaged during the following ODF process.

According to the method for forming the alignment layer of the present invention, the substrate is vertically moved up and down when the primary and secondary pre-cure processes are carried out. However, it is also possible to horizontally move the substrate during the primary and secondary pre-cure processes. In this case, the substrate coated with the alignment material is introduced into an apparatus having two heat plates in such a manner that the primary pre-cure process for the substrate is performed on the first heat plate having a relatively lower temperature and the secondary pre-cure process for the substrate is performed on the second plate having a relatively higher temperature.

The horizontal pre-cure processes may present curing effect identical to that of the vertical pre-cure processes as described above.

According to the present invention, the pre-cure process is carried out twice with mutually different temperature conditions, so the stable phase-separation can be achieved between the organic polymer and the solvent, allowing the alignment layer to have a highly ordered alignment surface. Therefore, the performance of the alignment layer can be prevented from being degraded even if the alignment layer is formed through the ODF process.

Since the performance of the alignment layer cannot be degraded, even if the liquid crystal layer is formed through the ODF process when fabricating the large-sized LCD, it is possible to improve the image quality of the LCD.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for forming an alignment layer on inner uppermost portions of an upper substrate having a pixel electrode and a lower substrate having a common electrode such that the alignment layer has a highly ordered alignment surface for aligning liquid crystal in a predetermined direction, the method comprising the steps of:
  i) coating a mixing solution including a solvent and organic polymer materials consisting of polyimide and polyamic acid on the upper and lower substrates;
  ii) pre-curing the mixing solution twice with mutually different temperatures, thereby volatizing the solvent and obtaining stable phase-separation between the organic polymer materials and the solvent while forming the highly ordered alignment surface on the alignment layer; and
  iii) completely curing the pre-cured mixing solution at a temperature of about 180 to 240° C.

2. The method as claimed in claim 1, wherein the pre-curing process includes a primary pre-curing process, which is performed at a temperature less than 50° C. under vacuum pressure of about −35 to −50 psi, and a secondary pre-curing process, which is performed at a temperature within a range of about 50 to 75° C. under vacuum pressure identical to the vacuum pressure of the primary pre-curing process.

3. The method as claimed in claim 1, wherein the primary pre-curing process is performed at a temperature within a range of about 40 to 50° C.

4. A method for forming an alignment layer on inner uppermost portions of an upper substrate having a pixel electrode and a lower substrate having a common electrode such that the alignment layer has a highly ordered alignment surface for aligning liquid crystal in a predetermined direction, the method comprising the steps of:
  i) coating a mixing solution including a solvent and organic polymer materials consisting of polyimide and polyamic acid on the upper and lower substrates;
  ii) primarily pre-curing the mixing solution at a temperature less than 50° C. under vacuum pressure of about −35 to −50 psi;
  iii) secondarily pre-curing the mixing solution at a temperature within a range of about 50 to 75° C. under vacuum pressure of about −35 to −50 psi in such a manner that stable phase-separation is obtained between the organic polymer materials and the solvent; and
  iv) completely curing the pre-cured mixing solution at a temperature of about 180 to 240° C.

5. The method as claimed in claim 4, wherein the primary pre-curing process is performed at a temperature within a range of about 40 to 50° C.

* * * * *